United States Patent [19]

Johnson

[11] Patent Number: 5,014,607
[45] Date of Patent: May 14, 1991

[54] WINDOW WIND GUARD FOR MOTOR VEHICLES

[76] Inventor: Michael K. Johnson, 1230 Monterey Blvd., San Francisco, Calif. 94127

[21] Appl. No.: 480,821

[22] Filed: Feb. 16, 1990

[51] Int. Cl.⁵ ............................................. B60H 1/24
[52] U.S. Cl. ................................................ 98/2.13
[58] Field of Search ............................. 98/2.12, 2.13

[56] References Cited

U.S. PATENT DOCUMENTS

| | | | |
|---|---|---|---|
| 1,588,654 | 6/1926 | Brownlee | 98/2.13 |
| 1,939,273 | 12/1933 | Osborne | 49/61 X |
| 2,011,667 | 8/1935 | Wilson | 49/61 X |
| 2,034,528 | 3/1936 | Oakes | 98/2.13 |
| 2,242,606 | 5/1941 | Duncan | 49/61 X |
| 2,847,246 | 8/1958 | Caradonna | 98/2.12 |
| 3,915,078 | 10/1975 | Woods, Jr. | 98/2.12 |
| 4,089,256 | 5/1978 | Furcini | 98/2.12 |
| 4,347,781 | 9/1982 | Hassell | 98/2.12 |
| 4,527,466 | 7/1985 | Kossor et al. | 98/2.13 |
| 4,773,308 | 9/1988 | Allen, Jr. | 98/2.13 |

Primary Examiner—Harold Joyce
Attorney, Agent, or Firm—Phillips, Moore, Lempio & Finley

[57] ABSTRACT

A wind guard is adapted for mounting on the upper edge of a vertically movable window of a motor vehicle, such as an automobile. The wind guard is preferably composed of a flexible plastic material and has an inverted U-shape so that it can be slipped onto the window and adjusted vertically thereon to provide the desired amount of window opening.

15 Claims, 1 Drawing Sheet

U.S. Patent    May 14, 1991    5,014,607
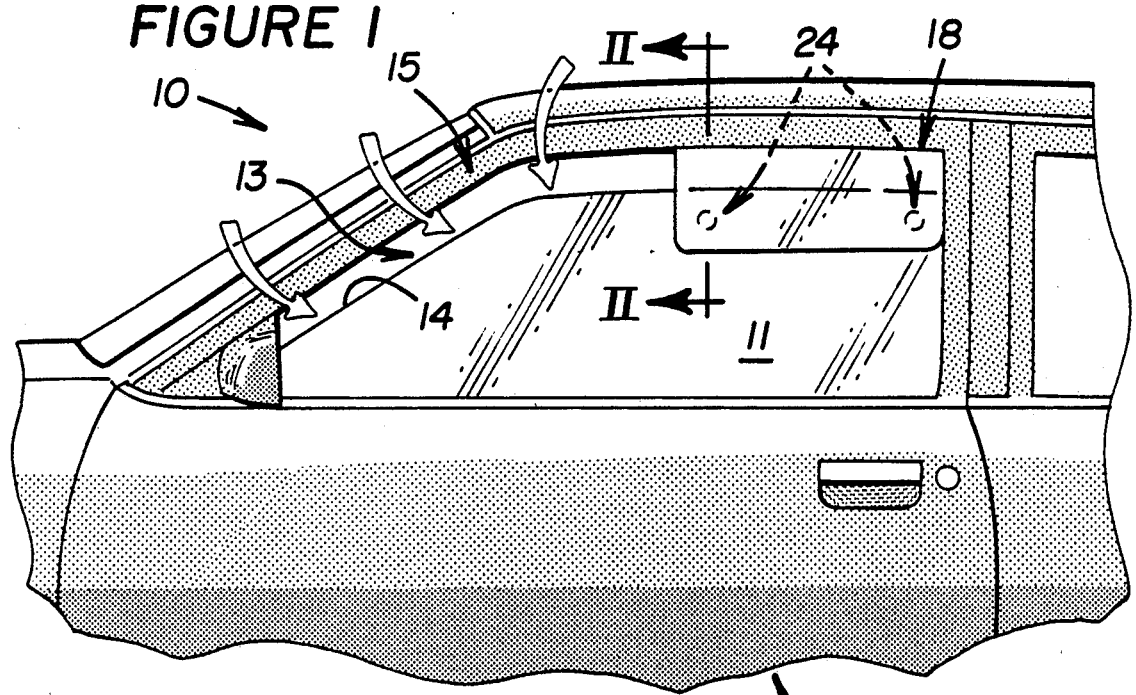
FIGURE 1
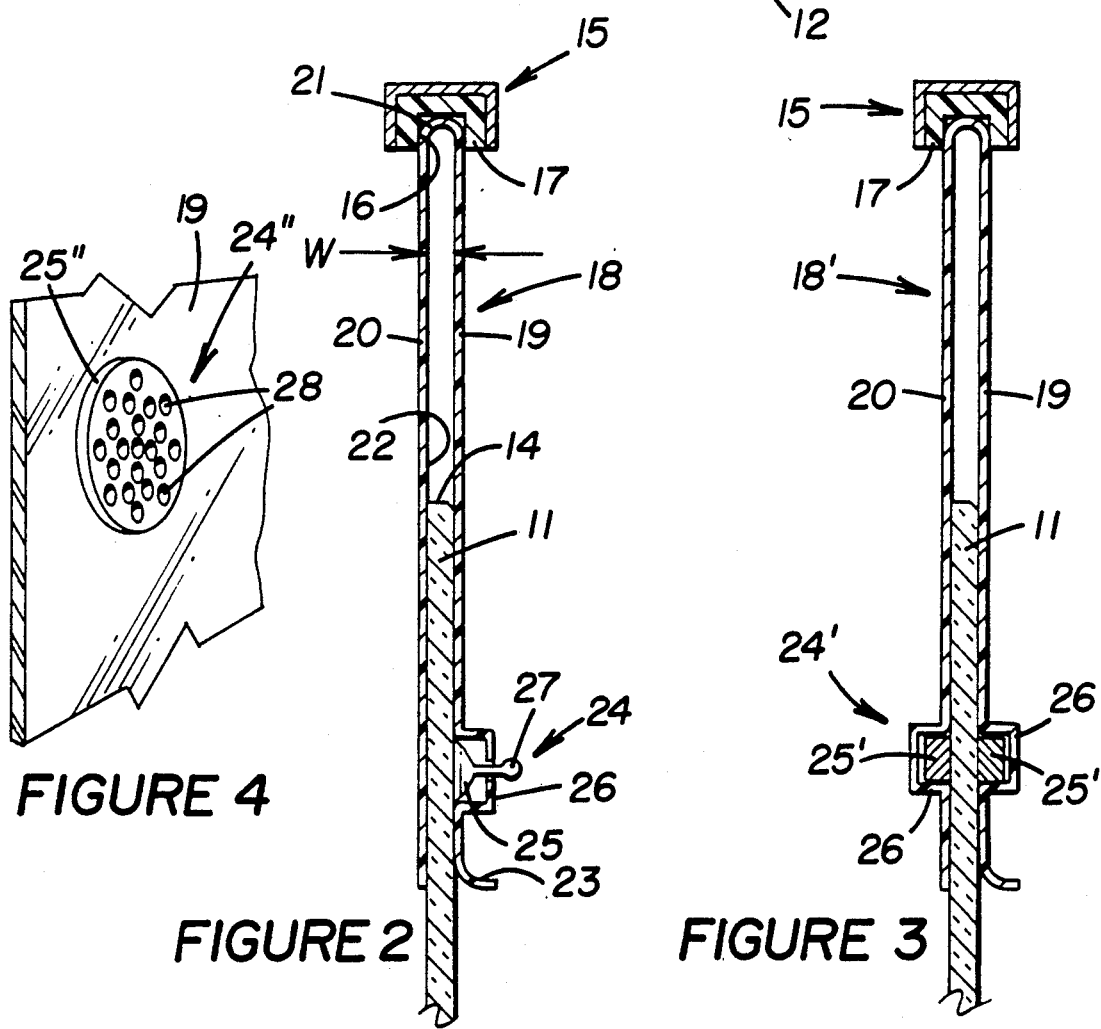
FIGURE 4
FIGURE 2
FIGURE 3

WINDOW WIND GUARD FOR MOTOR VEHICLES

TECHNICAL FIELD

This invention relates to a wind guard for motor vehicles and more particularly to a plastic wind guard adapted to be adjustably mounted on the upper edge of a closable window of a motor vehicle.

BACKGROUND OF THE INVENTION

The windows of modern day automobiles and small trucks are normally formed as one piece whereby lowering of the window will provide an opening along the entire upper edge of the window. Prior to the advent of the one-piece window, many automobiles included a separate small vent window that could be opened without opening the larger window.

Various wind deflectors or guards have been proposed for closing a portion of the opening provided when the one-piece window is partially opened. Wind deflectors of this type are normally attached to a window frame to provide a fixed opening and thus cannot be adjusted to vary the size thereof. Examples of these types of fixed wind deflectors are illustrated in U.S. Pat. Nos. 3,915,078 and 4,089,256.

SUMMARY OF THE INVENTION

An object of this invention is to provide an improved and adjustable wind guard for the windows of motor vehicles.

The wind guard is adapted to be mounted over the upper edge of an openable window of a motor vehicle for vertical adjustment thereon to selectively vary the size of an opening defined between the upper edge of the window and a frame.

In the preferred embodiment of this invention, the wind guard comprises a pair of overlying panels connected together only at their upper ends to define an inverted and generally U-shaped channel. Thus, the wind guard can be slip-fit over the upper edge of the window and adjusted vertically to extend at a predetermined distance therepast to selectively vary the size of the window opening.

BRIEF DESCRIPTION OF THE DRAWING

Other objects and advantages of this invention will become apparent from the following description and accompanying drawing wherein:

FIG. 1 is a side elevational view partially illustrating a motor vehicle having a wind guard embodiment of this invention mounted on a window thereof;

FIG. 2 is an enlarged sectional view of the wind guard, taken in the direction of II—II in FIG. 1;

FIG. 3 is a view similar to FIG. 2, but illustrates a modified attachment means for the wind guard; and FIG. 4 is an isometric view illustrating another modification of the attachment means.

DESCRIPTION OF THE PREFERRED EMBODIMENT

FIG. 1 partially illustrates an automobile 10 having a glass window 11 mounted for vertical movement on a door 12 in a conventional manner. In particular, the window is adapted to be moved between a lowered position to define a variable opening 13, between an upper edge 14 of the window and a frame 15, and a raised position closing the opening and window. As shown in FIG. 2, the upper edge of the window will normally engage within a channel 16, defined within an inverted and generally U-shaped elastomeric sealing gasket 17 when the window is closed.

This invention is directed to a wind guard 18 adapted to be mounted over upper edge 14 of window 11 for vertical adjustment thereon to selectively adjust the effective area of opening 13 and totally block a portion thereof. It should be understood that the wind guard could be positioned at other locations on the upper edge of the window, e.g., on the slanted edge portion thereof in FIG. 1, adjacent to the windshield of the automobile. Furthermore, it should be understood that the wind guard has application to windows employed on other types of motor vehicles, such as trucks or boats.

Referring to FIG. 2, wind guard 18 comprises a pair of overlying inner and outer panels 19 and 20, respectively, connected together only at a reversed bent, upper end 21 thereof. The panels thus define an inverted and generally U-shaped channel 22 open at its bottom end and lateral sides. This construction facilitates the slip-fit mounting of the wind guard on the window.

The width W of the channel, between the inner surfaces of the panels, is sized to substantially conform to the thickness of the window. Thus, the wind guard can be slip fit over the upper edge of the window and adjusted vertically to extend at a predetermined distance thereabove. The window can be raised, as shown in FIG. 2, to snugly engage upper end 21 of the wind guard within channel 16 of sealing gasket 17. The frictional contact between the sealing gasket and wind guard will aid in retaining the wind guard in position.

The wind guard is preferably composed of a flexible plastic material formed as a sheet and then reverse folded over onto itself when subjected to heat and folding pressure to assume the U-shaped configuration illustrated in FIG. 2. The panels are preferably formed to be at least substantially co-extensive relative to each other. Channel width W, when the wind guard is in its "relaxed" pre-installed state, is preferably slightly less than the thickness of the window on which it is to be mounted. For example, the width of the channel can be selected for mounting on most (slightly less) conventional window thicknesses to insure that panels 19 and 20 will clamp or pinch over the window to hold it in place thereon by frictional engagement therewith.

The wind guard may be composed of any standard plastic material that will exhibit the desired impact strength, flexibility and related chemical and physical characteristics required for this purpose. For example, suitably composed thermoplastic resins, such as acrylic, acetate, polycarbonate and vinyl may prove acceptable. The wind guard material may be clear or may have a standard pigment added thereto for tinting and anti-sunglare purposes. Panels 19 and 20 of the wind guard may each have a height approximating from 4.0 to 8.0 in. and a length approximating from 16.0 to 24.0 in. to meet a wide variety of commercial applications.

As further shown in FIG. 2, a finger flange 23 can be post-formed on a lower end of inner panel 19 to extend outwardly therefrom. The flange will facilitate finger adjustment of the wind guard to its desired vertical position, relative to upper edge 14 of the window. The flange can extend entirely across the length of panel 19 or it can be in the form of a shorter flange, sufficiently large to permit grasping by the operator's fingers.

Although wind guard 18 can be utilized as described above, in certain applications it may prove desirable to provide the wind guard with additional attachment means 24 (FIGS. 1 and 2) for aiding in the releasable attachment of at least one of the panels at a predetermined vertical position on the window. In the embodiment illustrated in FIG. 2, attachment means 24 comprises an elastomeric suction cup 25 suitably secured within a cup-shaped housing 26 formed integrally as a part of inner panel 19. A stem 27, formed integrally with the suction cup, is press-fit into a hole formed through the housing to retain the cup in place. As shown in FIG. 1 a pair of attachment means are preferably positioned on a lower end of wind guard 18 and laterally spaced thereon, adjacent to the lateral sides thereof.

FIG. 3 illustrates a modified wind guard 18' including attachment means 24' in the form of a pair of magnets 25', each attached on a respective one of panels 19 and 20. Each magnet is suitably secured within a respective housing 26 to be disposed in facing relationship relative to the other magnet whereby the magnetic field between the magnets (functioning through the window) will aid in clamping or pinching panels 19 and 20 on window 11.

FIG. 4 illustrates a modified attachment means 24" comprising a disc-shaped member 25" adapted to be adhesively secured on the inner side of panel 19 to replace attachment means 24 and 24'. The member sufficiently thin thickness (e.g. 0.06 in.) to not interfere with the adjustment of the wind guard on window 11, but yet provides a sufficiently high frictional contact therewith to aid in retaining the wind guard in a pre-set position. A plurality of closely-spaced, semi-spherical suction cups 28 can be formed on the inner side of member 25" to aid in the retention function. The member can be composed of a suitable elastomeric material, such as rubber, silicone rubber, neoprene, etc.

I claim:

1. A wind guard for the window having a frame of a motor vehicle, said window having a predetermined thickness and adjustably mounted for vertical movement between a lowered position to define an opening between an upper edge of said window and said frame and a raised position closing said window whereby the upper edge of said window will normally engage within a channel of said frame, said wind guard composed of a flexible plastic material and comprising, a pair of overlying inner and outer panels, each having a length substantially less than the length of the upper edge of said window, connected together only at upper ends thereof to define an inverted and generally U-shaped channel means open at its bottom and lateral sides, the width of said channel means between said panels being sized to be slightly less than the thickness of said window for permitting said panels to flex and be slip-fit over the upper edge of said window to extend at a predetermined distance thereabove and at a preset position above the upper edge of said window when the window is raised to engage the upper end of said guard within said channel means, and to provide a substantial vent opening between the upper edge of said window, said frame and said wind guard, and holding means for positively holding said guard in said preset position above the upper edge of said window, said holding means disposed interiorly on an inner side of at least one of said inner and outer panels and at least said outer panel being impervious to the passage of air therethrough.

2. The wind guard of claim 1 wherein said inner and outer panels are at least substantially co-extensive relative to each other.

3. The wind guard of claim 1 wherein said material is clear.

4. The wind guard of claim 1 wherein said material is tinted with an anti-sunglare material.

5. The wind guard of claim 1 wherein said inner and outer panels each have a height approximating from 4.0 to 8.0 in. and a length approximating from 16.0 to 24.0 in.

6. The wind guard of claim 1 further comprising a finger flange formed on a lower end of said inner panel to extend outwardly therefrom.

7. The wind guard of claim 1 wherein said holding means is positioned between the upper and lower ends of said guard and is spaced vertically upwardly from the lower end of said guard.

8. The wind guard of claim 7 wherein a pair of said holding means are laterally spaced on said guard, adjacent to the lateral sides thereof.

9. The wind guard of claim 7 wherein said holding means comprises a suction cup.

10. The wind guard of claim 7 wherein said holding means comprises a pair of magnets each attached on a respective one of said inner and outer panels in facing relationship relative to each other.

11. The wind guard of claim 1 further comprising a door of a motor vehicle having said window and said frame mounted thereon.

12. In combination with a window having a frame of a motor vehicle, said window having a predetermined thickness and adjustably mounted for vertical movement between a lowered position to define an opening between an upper edge of said window and said frame and a raised position closing said opening, wind guard means mounted over the upper edge of said window for vertical positioning thereon to selectively control the effective area of said opening said wind guard means comprising a pair of overlying, flexible and plastic inner and outer panels connected together only at upper ends thereof to define an inverted, generally U-shaped channel therebetween, open at lower ends of said panels and sized to slip-fit over said window, and holding means for positively and releasably holding the upper ends of said panels at a predetermined and preset vertical position relative to the upper edge of said window, said holding means disposed interiorly on at least one of said inner and outer panels and spaced vertically above the lower ends of said panels, at least said outer panel being impervious to the passage of air therethrough.

13. The combination of claim 12 wherein said holding means comprises a suction cup.

14. The combination of claim 12 wherein said holding means comprises a pair of magnets each attached on a respective one of said panels in facing relationship relative to each other.

15. In combination with a window having a frame of a motor vehicle, said window having a predetermined thickness and adjustably mounted for vertical movement between a lowered position to define an opening between an upper edge of said window and said frame and a raised position closing said opening, wind guard means mounted over the upper edge of said window for vertical adjustment thereon to selectively adjust the effective area of said opening comprising a pair of overlying, flexible plastic panels connected together only at upper ends thereof to define an inverted, generally U-shaped channel therebetween sized to slip-fit over said window, and means for releasably attaching at least one of said panels at a predetermined vertical position, relative to said window, comprising a suction cup or a pair of magnets each attached on a respective one of said panels in facing relationship relative to each other.

* * * * *